(12) United States Patent
Kronander

(10) Patent No.: US 10,502,828 B2
(45) Date of Patent: Dec. 10, 2019

(54) SYSTEM FOR DETECTING SUBSURFACE OBJECTS AND UNMANNED SURFACE VESSEL

(71) Applicants: Torbjoern Kronander, Stockholm (SE); Martin Eronn, Linkoeping (SE)

(72) Inventor: Torbjoern Kronander, Stockholm (SE)

(73) Assignees: Torbjoern Kronander, Stockholm (SE); Martin Eronn, Linkoeping (SE)

( * ) Notice: Subject to any disclaimer, the term of this patent is extended or adjusted under 35 U.S.C. 154(b) by 0 days.

(21) Appl. No.: 15/768,799

(22) PCT Filed: Oct. 24, 2016

(86) PCT No.: PCT/EP2016/075569
§ 371 (c)(1),
(2) Date: Apr. 16, 2018

(87) PCT Pub. No.: WO2017/076681
PCT Pub. Date: May 11, 2017

(65) Prior Publication Data
US 2018/0306916 A1    Oct. 25, 2018

(30) Foreign Application Priority Data
Nov. 4, 2015 (SE) ...................... 1551424

(51) Int. Cl.
*G01S 15/04*    (2006.01)
*G01S 7/00*    (2006.01)
*G01S 15/89*    (2006.01)

(52) U.S. Cl.
CPC .............. *G01S 15/04* (2013.01); *G01S 7/003* (2013.01); *G01S 7/006* (2013.01); *G01S 15/89* (2013.01)

(58) Field of Classification Search
None
See application file for complete search history.

(56) References Cited

U.S. PATENT DOCUMENTS 5,689,475 A * 11/1997 Chaumet-Lagrange ..................... B63B 35/00
367/88
6,285,628 B1 * 9/2001 Kiesel ..................... G01S 15/89
367/103

(Continued)

FOREIGN PATENT DOCUMENTS

CN    103292792 A    9/2013
CN    103910053 A    7/2014

(Continued)

OTHER PUBLICATIONS

International Searching Authority (ISA), International Search Report and Written Opinion for International Application No. PCT/EP2016/075569, Jan. 20, 2017, 15 pages, European Patent Office, Netherlands.

(Continued)

*Primary Examiner* — Curtis J King
(74) *Attorney, Agent, or Firm* — Alston & Bird LLP

(57) ABSTRACT

The present disclosure relates to a system (300) for detecting subsurface objects within a confined sea area. The system comprises one or more surface vessels (301) and at least one control unit (302). Each surface vessel (301) comprises positioning means and is arranged to gather bathymetry measurements during controlled motion in a path within the confined sea area and to transmit the bathymetry measurements to the at least one control unit (302). The control unit (302) is arranged to receive bathymetry measurements from the one or more surface vessels (301). Each surface vessel (301) is unmanned and arranged to operate in an autonomous or remotely controlled state when gathering bathymetry measurements. The control unit (302) is arranged to retrieve bathymetry data representing said path from a memory in the control unit. The control unit (302) is further arranged to compare the received bathymetry measurements (Continued)

to the retrieved bathymetry data and to indicate a presence of a subsurface object upon determination of a deviation between received bathymetry measurements and retrieved bathymetry data for at least one geographical position along said path. The disclosure also relates to an unmanned surface vessel adapted to detect subsurface objects.

10 Claims, 5 Drawing Sheets

(56) References Cited

U.S. PATENT DOCUMENTS

| | | | | |
|---|---|---|---|---|
| 6,819,984 | B1* | 11/2004 | Bedckman | G01C 21/00 367/124 |
| 8,082,100 | B2* | 12/2011 | Grace | G05D 1/0206 701/300 |
| 8,154,953 | B1* | 4/2012 | Sims | A01K 97/00 367/107 |
| 8,310,899 | B2* | 11/2012 | Woodard, Jr. | B63C 11/52 367/15 |
| 9,151,858 | B2* | 10/2015 | Hovstein | G01V 1/3826 |
| 9,244,168 | B2* | 1/2016 | Proctor | G01S 15/8902 |
| 9,340,267 | B2* | 5/2016 | Lambertus | B63G 7/00 |
| 10,042,068 | B2* | 8/2018 | Woodward, Jr. | B63B 25/28 |
| 2003/0078706 | A1* | 4/2003 | Larsen | G01C 21/00 701/21 |
| 2006/0191458 | A1* | 8/2006 | George | B63B 35/00 114/253 |
| 2010/0131133 | A1 | 5/2010 | Koda et al. | |
| 2012/0020527 | A1* | 1/2012 | Abileah | G06K 9/0063 382/106 |
| 2014/0116311 | A1* | 5/2014 | Holemans | B63B 1/12 114/39.23 |
| 2014/0345511 | A1 | 11/2014 | Rikoski et al. | |
| 2015/0078123 | A1* | 3/2015 | Batcheller | G01S 17/89 367/7 |
| 2015/0192488 | A1* | 7/2015 | Xu | B63C 11/40 702/38 |
| 2016/0147223 | A1* | 5/2016 | Edwards | G05D 1/0027 701/2 |
| 2017/0074664 | A1* | 3/2017 | Cheramie | G01C 11/30 |
| 2018/0082166 | A1* | 3/2018 | Kukulya | G06K 19/07749 |
| 2018/0162393 | A1* | 6/2018 | Lee | B60W 30/095 |

FOREIGN PATENT DOCUMENTS

| | | |
|---|---|---|
| DE | 29823560 U1 | 9/1999 |
| EP | 0685387 A1 | 12/1995 |
| GB | 2505121 A | 2/2014 |
| GB | 2512455 A | 10/2014 |
| WO | WO 2012/078022 A1 | 6/2012 |
| WO | WO 2014/173393 A1 | 10/2014 |
| WO | WO 2015/036417 A1 | 3/2015 |

OTHER PUBLICATIONS

International Preliminary Examining Authority, International Preliminary Report on Patentability, including Applicant's dated Sep. 4, 2017 response to ISA's dated Jan. 20, 2017 Written Opinion, for International Application No. PCT/EP2016/075569, dated Sep. 29, 2017, European Patent Office, Netherlands.
Swedish Patent and Registration Office, Office Action for Application No. 1551424-3, dated May 13, 2016, 5 pages, Sweden.

\* cited by examiner

SYSTEM FOR DETECTING SUBSURFACE OBJECTS AND UNMANNED SURFACE VESSEL

CROSS REFERENCE TO RELATED APPLICATIONS

This application is a National Stage Application, filed under 35 U.S.C. 371, of International Application No. PCT/EP2016/075569, filed Oct. 24, 2016, which International application claims priority to Swedish Application No. 1551424-3, filed Nov. 4, 2015; the contents of both which as are hereby incorporated by reference in their entirety.

BACKGROUND

Related Field

The present disclosure relates generally to a system for detecting subsurface objects. The disclosure also relates to an unmanned surface vessel forming part of such system.

Description of Related Art

Underwater monitoring may be performed for seabed mapping purposes or any other type of mapping purposes, but also during search operations, for example when searching for submarines or other type of objects located in a sub-surface position below the surface of the sea.

Detection of sub-surface objects may be performed using acoustic reflections or light reflection, e.g. by using sonar or Lidar sensing technology. Sonar technology comprises use of passive or active sonar. Passive sonars are not very effective against quiet objects because of the frequent lack of data on the target signature. The high irregularity of the seabed may also give false sonar contacts, a problem faced when using either passive or active sonar. Furthermore active sonars are difficult to use when the target is lying still, hiding behind cliffs or just looking like any natural object on the sea floor. Use of an active sonar system may also be difficult in that the searched object may be small in comparison to the search area; if the object is capable of movement, this will add to the difficulties.

Great variations in sea temperature and salinity, freshwater influx from rivers, and the effect of tides, currents, ice, wind, and waves, as well as natural and human-made ambient noise adversely affect the work of both passive and active sonars. In the shallow waters of an archipelago, the problem of using sonar equipment is compounded by strong reverberations caused by sound reflection from the seabed, the surface, and the nearby islands.

In a sea environment such as the Baltic Sea environment, the water depths vary greatly from very deep regions to shallow depths of 200 meters providing a complex environment for underwater monitoring. Particularly in the shallow waters of archipelagos, underwater monitoring has proved to be quite difficult due to characteristics of the seabed as well as the water. This is especially the case when, as mentioned above, the targets lies still on the sea floor.

In addition to the practical problems associated with shallow water, the amount of resources needed to effectively search for objects in shallow waters, e.g. helicopters, surface ships and submarines, are often very costly. Sensors designed to operate in deep waters of an ocean are usually ill-suited for detecting quiet objects in shallow waters in that they either have limited search rate, or that those with higher search rates generally are ineffective against slow and deep targets.

A problem with known solutions for underwater monitoring is that it is difficult to monitor a large area in a sufficiently short time when the searched underwater object is capable of moving out of the search area during monitoring. There is a need for a cost effective and reliable solution to cover a large search area in a short time.

BRIEF SUMMARY

It is an object of the present disclosure provide an underwater monitoring system and a surface vessel which seek to mitigate, alleviate, or eliminate one or more of the above-identified disadvantages and deficiencies in the art, singly or in any combination.

This object is solved by a system for detecting subsurface objects within a confined sea area. The system comprises one or more surface vessels and at least one control unit. Each surface vessel comprises positioning means and bathymetry measurement means and is arranged to gather bathymetry measurements during controlled motion in a path within the confined sea area and to transmit the bathymetry measurements to the control unit. The at least one control unit is arranged to receive bathymetry measurements from the surface vessels. Each surface vessel is unmanned and arranged to operate in an autonomous or remotely controlled state when gathering bathymetry measurements. The at least one control unit is arranged to retrieve bathymetry data representing said path from a memory in the control unit and to compare the received bathymetry measurements to the retrieved bathymetry data. The control unit is further arranged to indicate a presence of a subsurface object upon determination of a deviation between received bathymetry measurements and retrieved bathymetry data for at least one geographical position along said path.

The system enables the use of unmanned, small and inexpensive surface vessels to detect subsurface objects within a confined sea area. The need for the costly equipment associated with the prior art, such as naval ships, helicopters and submarines, can be greatly reduced or eliminated at the same time as the probability for successful detection is increased. When employing multiple surface vessels, i.e. a fleet of cooperating surface vehicles, the system benefits from multi-sensor monitoring implying that a large area may be covered within a short time period. This can greatly reduce the time needed to search a predetermined area and/or increase the possible size of the predetermined area to be searched.

The object of the disclosure is also achieved by a surface vessel adapted to detect subsurface objects within a confined sea area, the surface vessel comprising propulsion means arranged move the surface vessel along a path within a confined sea area and bathymetry measurement means arranged to gather bathymetry measurements along the path. The surface vessel further comprises control circuitry for operating the surface vessel in an autonomous or remotely controlled state, and controlling motion of the surface vessel along the path during gathering of the bathymetry measurements. A control unit in the surface vessel is arranged to receive the bathymetry measurements from the bathymetry measurement means, to retrieve bathymetry data representing said path from a memory in the control unit, to compare the received bathymetry measurements to the retrieved bathymetry data representing said path. The control unit is arranged to indicate presence of a subsurface object when there is a deviation between received bathymetry measurements and the retrieved bathymetry data for at least one geographical position along the path.

The surface vessel represents a cost effective and easy to deploy sensor carrier which is possible to use by itself or together with further surface vessels in a manner of operation that does not require pre-planning of a route or coordination of the vessels in the monitored sea area.

BRIEF DESCRIPTION OF THE FIGURES

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION OF VARIOUS EMBODIMENTS

Figure 1:
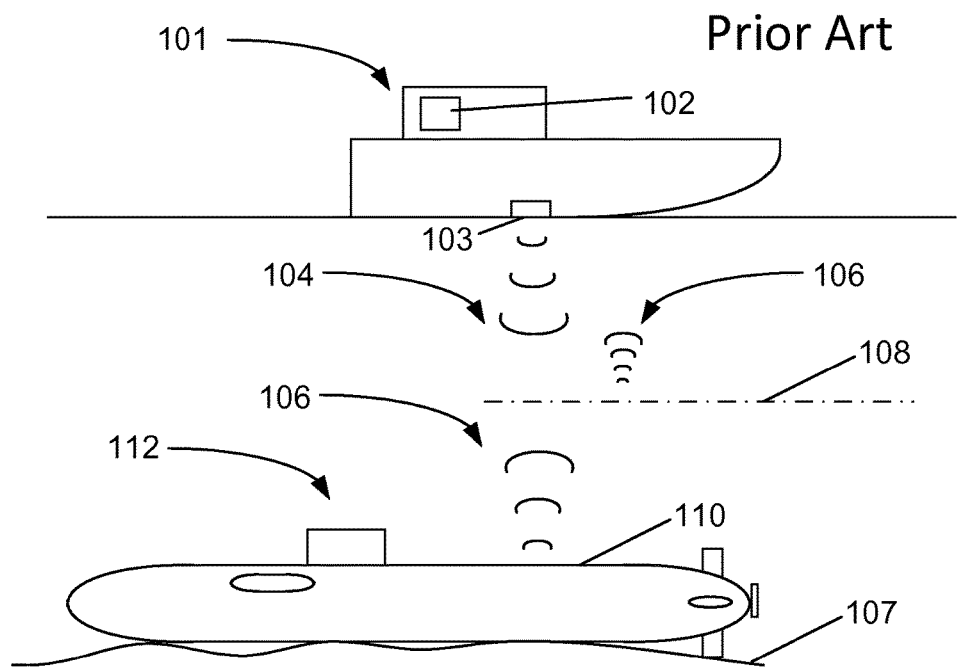
FIG. 1 illustrates a prior art scenario for detecting subsurface objects.

Aspects of the present disclosure will be described more fully hereinafter with reference to the accompanying drawings. The devices and method disclosed herein can, however, be realized in many different forms and should not be construed as being limited to the aspects set forth herein. Like numbers in the drawings refer to like elements throughout. The terminology used herein is for the purpose of describing particular aspects of the disclosure only, and is not intended to limit the invention. As used herein, the singular forms "a", "an" and "the" are intended to include the plural forms as well, unless the context clearly indicates otherwise.

FIG. 1 illustrates a prior art scenario for underwater monitoring. A staffed ship 101, typically a naval ship, is equipped with sonar equipment 103. In the illustrated scenario, the sonar equipment 103 is adapted to transmit sonar signals 104 under the surface vessel 101 and to receive at least one reflected signal 106 due to the transmitted sonar signal 104. The received at least one sonar signal 106 is analysed by processing circuitry 102, typically using software adapted to detect submarine sonar signatures. In an ideal case, the sonar signal 104 propagates unaffected and is reflected 106 at a surface 110 of a submarine 112, and the reflected signal 106 is then received by the sonar 103 and analysed by the processing circuitry 102. However, in practice there are lots of complications associated with submarine detection in shallow waters, some having been addressed above in the background section. The situation illustrated in FIG. 1 is quite typical for a submarine 112 trying to evade detection in shallow waters. The submarine 112 rests on, or stays very close to, the seabed 107. By doing so, the submarine 112 takes advantage of the often highly irregular seabed 107 to mask its sonar signature, thereby making it less likely for the processing circuitry 102 to determine that the received at least one sonar signal 106 comprises a submarine sonar signature. Furthermore, by lying still or moving very slowly, sound emitted by the submarine 112 is greatly reduced, which hampers the ability of passive sonar equipment to detect the submarine 112. Human observers on land can for instance provide data of where the search vessels are over radio to the submarine, so that it moves only when there are no search vessels in the vicinity.

In addition to the irregularities of the seabed 107, varying water density also impedes the ability of the surface vessel 101 to detect the submarine 112. At a certain depth below the sea surface, the water temperature typically changes drastically at a so-called thermocline 108. The change in water temperature will give rise to a corresponding change in water density. The change in water density means that at least part of the sonar signal 104 will be reflected 106 at the thermocline 108. An additional complication is that the change in density will change the angle at which the sonar signal 104 propagates below the thermocline 108 (not illustrated). The reduced sonar signal 106 strength below the thermocline 108, the altered angle of the sonar signal 106 and consequently the reflected signals 106, as well as interference from reflected signals at the thermocline 108 all impede the ability to detect the submarine 112. Likewise variations in salt concentration may create layers that refract or reflect sound and sonar signals making search more difficult.

Other prior art solutions includes using helicopters carrying active or passive sonar systems, or passive sonar buoys floating in a surface position.

Figure 2:
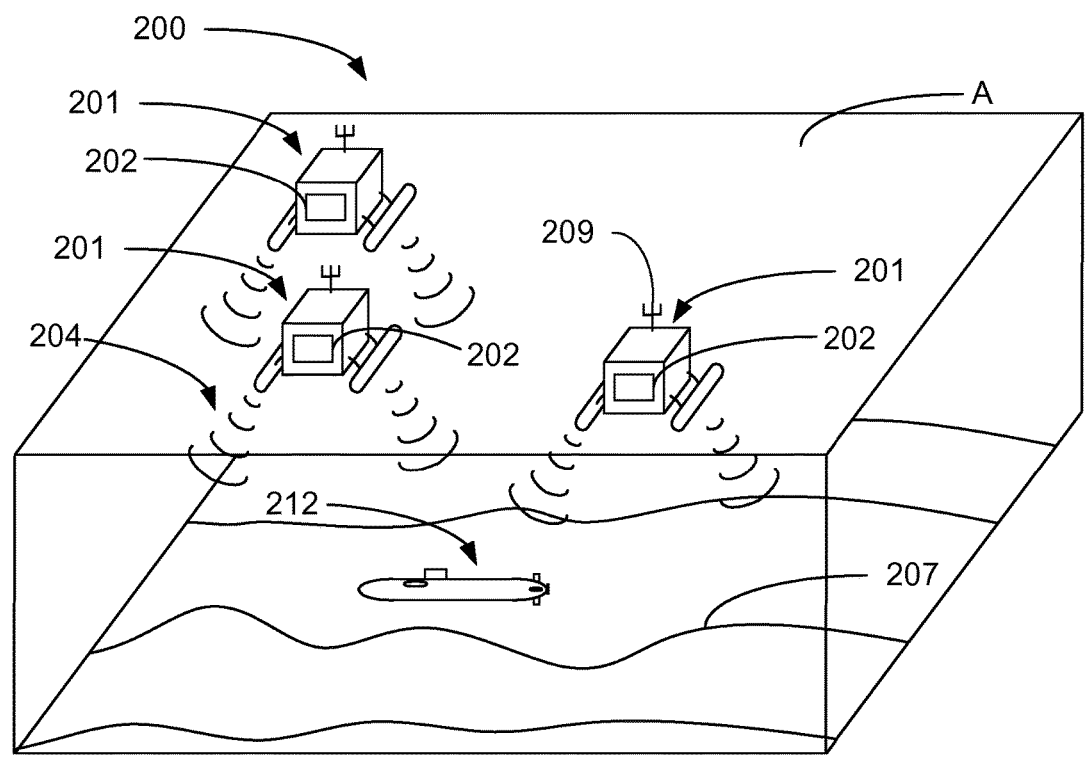
FIG. 2 illustrates an operating scenario for an example system solution.

FIG. 2 illustrates an operating scenario for an example system according to the present disclosure. A system 200 for detecting subsurface objects is disclosed. The system 200 is arranged to detect subsurface objects in a confined sea area A for which at least some bathymetry data is known within the system or obtainable from the system. The system comprises one or more surface vessels 201, here illustrated as a fleet of three surface vessels cooperating in monitoring and detecting objects of the confined sea area A. The system also comprises at least one control unit 202. According to an aspect of the invention, each surface vessel is arranged to comprise a control unit that receives bathymetry measurements form the surface vessel in which it is comprised. Even though denominated as a surface vessel, such a vessel may operate with parts of the hull in a subsurface position. Each surface vessel 201 comprises positioning means, e.g. a GNSS receiver or a receiver for a local positioning system, here illustrated by a receiver antenna 209. Each surface vessel 201 is arranged to gather bathymetry measurements during controlled motion, e.g., propelled motion, in a path within the confined sea area A and to transmit the bathymetry measurements to the control unit 202. The at least one control unit 202 is arranged to receive bathymetry measurements from the one or more surface vessels 201.

Each surface vessel 201 is unmanned and arranged to operate in an autonomous or remotely controlled state, when gathering bathymetry measurements. According to an aspect of the invention, each surface vessel comprises wireless communication equipment for device to device communication with other surface vessels, for communicating bathymetry measurements to a remote control unit and/or for being remotely controlled from a remote control station, e.g., a ground based remote control station positioned along the coast line or a naval based remote control station positioned on a staffed ship. Remote control may imply controlling the drive direction of the surface vessel according to a deterministic model. Remote control may also comprise remote control of the intensity in the bathymetry measurements gathering. When making a first determination of a deviation between received bathymetry data and received bathymetry data in a surface vessel, the surface vessel may be instructed to perform high resolution measurements, e.g. more frequently in time than during default gathering of bathymetry measurements or with close distance between the geographical positions where the measurements are gathered. The remote control state may also be activated during a homing operation, whereby the one or more surface vessels are directed to a location where the surface vessels may be lifted out of the sea.

As mentioned above, each surface vessel may also be arranged to operate in a state of autonomous control, e.g., autonomous controlling a drive direction of the surface vessel. According to a further aspect of the invention, each surface vessel operating in the autonomous state is arranged to detect obstacles in its path and to autonomously adapt the path within the confined sea area upon detection of an obstacle. Control circuitry of the surface vessel may be adapted to initiate high resolution measurements upon a first determination of a deviation between received bathymetry measurements and retrieved bathymetry data, e.g. more frequently in time than during default gathering of bathymetry measurements or with close distance between the geographical positions where the measurements are gathered.

Thus, the control unit 202, arranged in each surface vessel, a coordinating surface vessel or in a remote control station, is arranged to compare each received bathymetry measurement to predetermined bathymetry data and identify deviations between a received bathymetry measurement and the predetermined bathymetry data. According to an aspect of the disclosure, each bathymetry measurement comprises position data. However, position data may also be attached to the bathymetry measurements based on a time when the bathymetry measurement was made and an estimated position at this time, or in any other way associated to the bathymetry measurements in a manner that allows real-time determination of deviations between received bathymetry measurements and received bathymetry data for at least one geographical position along said path.

According to an aspect of the disclosure, the system may also be used to determine initial bathymetry data, e.g., by operating one surface vessel in the confined sea area prior to the search operation or by operating a fleet of cooperating surface vessels in the confined sea area. When using the system to determine initial bathymetry data, the first comparison between received bathymetry measurements and received bathymetry data will result in a determination that bathymetry data is lacking for a geographical position along the path of the surface vessel, i.e., that there is an initial absence of bathymetry data. The control unit(s) will then store the bathymetry measurements as bathymetry data. In a case where a fleet of surface vessels are cooperating, said wireless communication equipment may be used to exchange bathymetry data between surface vessels contributing to measurement gathering.

Described with a method perspective, the system could be considered to perform a method that comprises two phases. In a first phase, bathymetric data is collected with a fine grid over the entire search area. This can be done long in advance or in an initial phase of a search operation, as will be discussed more in detail below. Consequently, the system obtains access to a bathymetric map consisting of a coordinate system (most often latitude and longitude) with grid points defined by their coordinates, geographical position, as well as the depth in that specific position. If bathymetric data is pre-collected and stored for an area, a reference value can be subtracted or added depending on the level of the water over all, or to compensate for tide.

In a second phase, gathered bathymetry measurements are compared to the stored reference data, bathymetry data gathered for each grid point. In other words, the depths measured by the searching surface vessels are compared to what they should be according to the reference data. The comparison between the pre-measured reference bathymetry data and the gathered bathymetry measurements, i.e., measured depths, is done in the control unit, which may either be in the vessel itself or in any other location. According to an aspect of the disclosure, the control unit will indicate presence of a subsurface object when the deviation between received bathymetry measurements and retrieved bathymetry data for a geographical position represents a reduced depth. An obstacle on the sea floor or above it, will be detected by a significant difference in depths in one or several grid points, i.e. grid points corresponding to geographical positions. When such an anomaly is detected an alarm is given, either by radio using a wireless communication equipment on-board the surface vessel or by any other means such as light, sound or digital communication, whereupon the search operation is continued with further monitoring and gathering of measurements, e.g. by the surface vessel itself or by other means, to detect the source of the anomaly.

According to an aspect of the disclosure, each surface vessel is arranged to detect obstacles in the path and to autonomously adapt the path within the confined sea area A upon detection of an obstacle.

The system enables the use of a plurality of small and inexpensive surface vessels in the performing of the underwater monitoring. The need for the costly equipment associated with the prior art, such as naval ships, helicopters and submarines, can be greatly reduced or eliminated. When employing multiple surface vessels, the system benefits from multi-sensor monitoring implying that a large area may be covered within a short time period. This can greatly reduce the time needed to search a predetermined area and/or increase the possible size of the predetermined area to be searched. The use of a fleet of surface vessels that perform search operation in parallel makes monitoring of each of them by humans and transmitting information on the search operation to an underwater, subsurface object difficult or impossible.

As mentioned above, each surface vessel 201 may comprise a control unit 202 arranged to receive bathymetry measurements from the surface vessel 201 in which it is comprised. This provides the benefit of parallel processing of bathymetry measurement data in a plurality of control units and also reduces the need for communicating between nodes, such as surface vessels 201, within the system, which saves energy and reduces the system's vulnerability to communication interfering events. However, even though there are significant advantages to having each surface vessel performing detecting of subsurface objects independent of the other surface vessels, the present invention is not limited to this embodiment. According to an aspect of the disclosure, a control unit may further be arranged to receive measurements from a plurality of surface vessels 201 and to perform a centralized processing of these measurements, i.e., comparing received bathymetry measurements to retrieved bathymetry data, determining a deviation between the gathered measurements and the data, and indicating a presence of a subsurface object based on this determination. Such an indication could comprise transmitting information to the surface vessel providing the bathymetry measurements that an object has been detected based on the received measurements. The surface vessel having a geographical position, may attempt to verify the detecting by gathering additional measurements at the same time as generating an alarm.

According to some aspects, each surface vessel 201 comprises wireless communication equipment for device to device communication with other surface vessels 201. The wireless communication equipment facilitates coordination of the one or more surface vessels 201, e.g., between the surface vessels or from a remote control station. For instance, a surface vessel 201 that adapts its path autonomously upon detection of an obstacle, can inform other surface vessels 201 in the system of the adapted path. The wireless communication equipment further facilitates exchange of e.g. measured bathymetry data, which can be used to improve the identification of deviations, since the additional data can be used to correct for measurement uncertainties. This will be explained further below.

According to some aspects, each surface vessel 201 is arranged to receive information relating to a water level of the confined sea area A, wherein the at least one control unit 202 is further arranged to use the received information relating to a water level of the confined sea area A to correct the received bathymetry measurement or to compensate for tide by internal or external computation.

Knowledge of the present water level enables the surface vessels 201 to correlate the bathymetry measurements to the water level, which improves the accuracy when comparing each received bathymetry measurement to predetermined bathymetry data.

According to some aspects, each bathymetry measurement comprises position data and wherein the bathymetry measurements are performed periodically based on a travelled distance or a travel time along the path. The position data facilitates autonomous navigation of each surface vessel. According to some aspects, each surface vessel comprises a global navigation satellite system, GNSS, receiver. According to some aspects, each surface vessel uses inertial navigation to determine its position. According to some aspects a local system can be set up to determine the vessels position, for instance a radio beacon arrangement or by other means According to some aspects, each surface vessel is further configured to navigate based on the comparison of each received bathymetry measurement to received bathymetry data.

As mentioned above, each surface vessel may be arranged for autonomous controlled motion in a drive direction of the surface vessel when operating in the autonomous state. The surface vessels may also be subject of remote control from the control unit during a remote control state, e.g. activated during a homing operation of the surface vessels. Such a homing operation may comprise bringing the surface vessels back to a launch and release point of the surface vessels, e.g. at the naval ship hosting the control unit, at another ship brought in for launch and release of the surface vessels or a point along the coast line. Such a launch and release point is also intended to be used for homing and recovery of the surface vessels when terminating surface monitoring in the confined sea area. A homing operation may also include directing the surface vessels to a point where intensified monitoring operations are considered beneficial, as will be explained further below. According to an aspect, each surface vessel is further arranged to be operated from the control station during a remote control state and wherein remote control comprises controlling the drive direction of the surface vessel according to a deterministic model.

According to another aspect of the disclosure, the adapting of the path within the confined sea area A comprises altering a drive direction of the surface vessel according to the stochastic model. When an obstacle is detected by the surface vessel, e.g. another surface vessel, the coast line or a virtual border line set up to delimit a confined sea area, the surface vessel is arranged to make a rotational movement in the water and continue in a new drive direction having a stochastically determined angle in relation to the previous drive direction. Other models for stochastically or deterministically selecting a new path of the surface vessel are known and are within the scope of the present disclosure.

As mentioned above, each surface vessel is arranged to detect obstacles in the path and to autonomously adapt the path within the confined sea area A according to a stochastic model upon detection of an obstacle. Detection of obstacles may be performed with a sonar system, e.g. a sonar system used in gathering bathymetry measurements, a passive sonar system, a motion sensor or any other suitable obstacle detection arrangement. An obstacle may here be any area of water with a water depth less than some predetermined value, i.e. such shallow waters where a submarine cannot possibly hide. This enables the surface vessel to adapt to a changing surrounding, e.g. a passing ship, another surface vessel in the fleet, and/or an irregular surrounding, e.g. a coastline or island.

According to some aspects, the at least one control unit is located on a staffed ship or in a command centre on shore. Processing of the bathymetry measurements in a separate control unit, such as a staffed ship, provides for limiting the amount of processing circuitry in the surface vessels 201 with subsequent benefits to cost and power consumption in each surface vessel 201 is reduced. Furthermore, the data relating to the received signals can be immediately compared with each other and used in a unified analysis when determining the presence of an anomaly. Additionally, according to aspects of the disclosure, the control unit may include a plurality of processors providing for parallel processing schemes and shared memory schemes, with parallel processing schemes including the goal of employing all processors to perform one large task.

According to some aspects of the disclosure, the control unit could also be partitioned between a plurality of surface vessels so that parallel processing schemes may be possible by using the plurality of processors provided in a fleet of surface vessels.

Figure 3A:
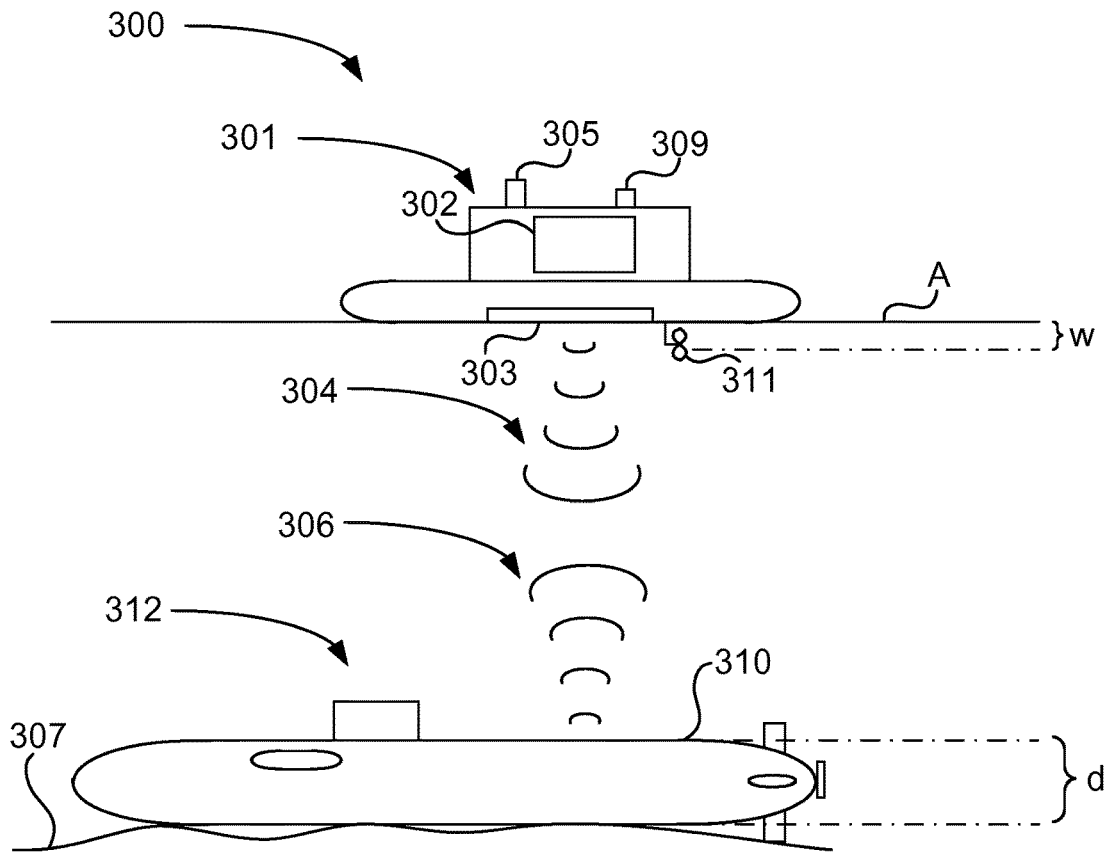
FIG. 3a illustrates an example system solution
Figure 3B:
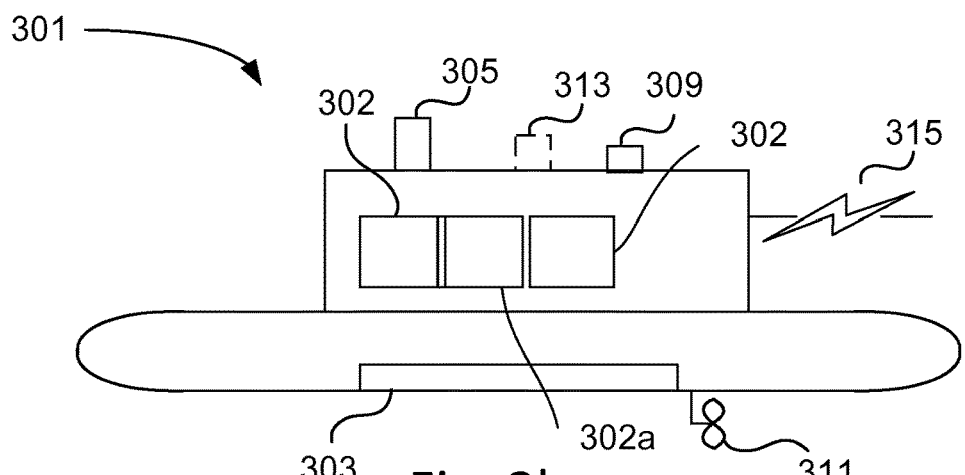
FIG. 3b is an example configuration of a surface vessel.

FIG. 3a illustrates an embodiment of a system 300 according to the present disclosure. The embodiment is among the simplest ones possible and is used to illustrate a central idea of how the predetermined bathymetry data is to be used conceptually. The system 300 comprises a single unmanned surface vessel 301, as illustrated more in detail in FIG. 3b. In the following disclosure, references will be made interchangeably to FIGS. 3a and 3b without further specification. When reference numbers that are only illustrated in FIG. 3a are mentioned, this implies reference to FIG. 3a, the same applies to reference numbers only cited in FIG. 3b.

The unmanned surface vessel 301 is adapted to detect subsurface objects within a confined sea area A. The surface vessel comprises propulsion means 311 arranged to move the surface vessel along a path within a confined sea area A. The surface vessel also comprises positioning means 309, e.g. a global navigation satellite system, GNSS, receiver and bathymetry measurement means 303 arranged to gather bathymetry measurements along the path, e.g. sonar 303 adapted to transmit a sonar signal 304 and receive at least one reflected signal 306 based on the transmitted sonar signal 304. The surface vessel also comprises a control unit 302 which is arranged to compare each received bathymetry measurement to the predetermined bathymetry data and identify deviations between a received bathymetry measurement and the predetermined bathymetry data.

According to an aspect of the disclosure, the surface vessel 301 further comprises collision detection means 305 arranged to detect obstacles in the path and to autonomously adapt the path within the confined sea area upon detection of an obstacle. According to an aspect, the collision detection means 305 comprises at least one of radar, a video camera or sonar equipment. According to one aspect each vessel transmits its position and receives that from the others, thus being able to predetermine an increased risk for collision. The surface vessel 301 also comprises a control unit 302 arranged to compare each received bathymetry measurement to obtained, e.g., stored or retrieved, bathymetry data and identify deviations between the gathered measurements and the retrieved data.

The surface vessel 301 further comprises control circuitry 302a, e.g., arranged in the control unit 302, for controlling a state of operation of the surface vessel 301 and wherein the surface vessel 301 is operated in an autonomous or remotely controlled state. The control circuitry 302a is arranged to control motion of the surface vessel along said path within a confined sea area during gathering of bathymetry measurements. As already mentioned the surface vessel also comprises a control unit 302 arranged to receive the bathymetry measurements from the bathymetry measurement means, to retrieve bathymetry data representing said path from a memory 302b in the control unit, tom compare the received bathymetry measurements to the retrieved bathymetry data representing and to indicate presence of a subsurface object when there is a deviation between received bathymetry measurements and the retrieved bathymetry data for at least one geographical position along the path.

According to an aspect, the surface vessel 301 comprises wireless communication equipment, here illustrated as a communication link 315, whereby the surface vessel 301 is adapted to receive control signals, and/or bathymetry measurements. According to a further aspect, the surface vessel 301 is adapted to transmit data relating to bathymetry measurements via the communication link 315. According to a further aspect, the surface vessel is arranged to indicate presence of a subsurface object by transmitting an alarm over the communication link, or by an alarm arrangement.

According to some aspects, the surface vessel 301 comprises collision detection means arranged to detect obstacles in the path of the surface vessel and to autonomously adapt the path within the confined sea area upon detecting an obstacle.

According to some aspects, the surface vessel 301 comprises signalling means 313 adapted to emit a signal upon an identified deviation between a received bathymetry measurement and the predetermined bathymetry data. According to a further aspect, the signal comprises one of a light signal, a sound signal and a wirelessly transmitted signal.

The surface vessel 301 is arranged to gather bathymetry measurements during controlled motion in a path within the confined sea area A and to transmit the bathymetry measurements to the control unit 302. The predetermined bathymetry data is typically determined with respect to a reference water level. As the actual water level changes, the actual water level will be offset from the reference water level by a water level offset w. The bathymetry measured by the sonar will depend on the water level offset. According to an aspect, the surface vessel 301 is arranged to receive information relating to a water level of the confined sea area A. The control unit 302 is further arranged to use the received information relating to a water level of the confined sea area A to correct the received bathymetry measurement. The determination of the presence of an anomaly is based on a comparison between a depth, estimated based on the received at least one reflected signal 306, and the predetermined bathymetry data. If the at least one reflected signal 306 is reflected from the hull 310 of a submarine 312 resting at the seabed 307, the estimated depth (assuming no disturbances from e.g. the thermocline) will differ from the predetermined bathymetry by a depth-difference d, the depth-difference d being determined by the shape of the submarine. The surface vessel signals the identification of an anomaly by either a light signal, a sound signal, or a wirelessly transmitted signal.

FIGS. 4a-4f illustrate embodiments of the disclosed system and different ways of coordinating a plurality of surface vessels.

Figure 4A:
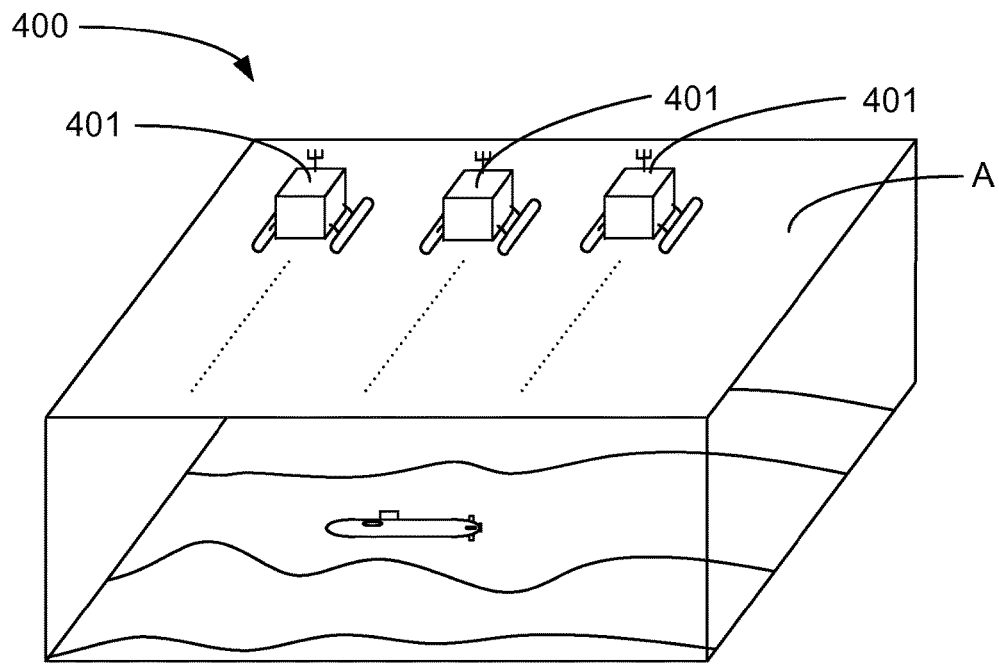
FIGS. 4a-f illustrate example system solutions.

FIG. 4a illustrates an embodiment of a system 400 that may be used for monitoring a larger confined sea area A for which bathymetry data is at least partially predetermined in a coordinated manner using collision detection means of the respective surface vessels to align the vessels when traveling across the sea area. The system 400 comprises a plurality of surface vessels 401, e.g., a surface vessel as described above in the context of FIG. 2, 3a or 3b. Each surface vessel 401 is arranged to gather bathymetry measurements during controlled motion in a path within the confined sea area A and to transmit the bathymetry measurements to a control unit comprised in the surface vessel. According to an aspect, each surface vessel comprises sonar arrangements by which the bathymetry measurements are made. According to a further aspect, the sonar comprises side-scan sonar arrangements. The control unit is arranged to receive bathymetry measurements from at least the surface vessel 401 in which it is comprised. Each control unit is arranged to compare each received bathymetry measurement to predetermined bathymetry data and identify deviations between a received bathymetry measurement and the predetermined bathymetry data. Each surface vessel 401 is further arranged to operate in an autonomous state when gathering bathymetry measurements. Each surface vessel is also arranged to detect obstacles in the path and to autonomously adapt the path within the confined sea area A upon detection of an obstacle. The plurality of surface vessels 401 is adapted to operate in an autonomous state to cooperatively search the confined sea area A. According to an aspect, a predetermined path is set for each surface vessel in the fleet and the predetermined trajectories to provide an overlap between the areas searched by the respective surface vessels 401. By maintaining a predetermined formation, the mutual spatial relationship between the surface vessels 401 is maintained, which enables an efficient use of shared measurement data. In particular, the mutual spatial relationship can be adjusted such that the surface vessels can cover each other's blind spots and/or have an overlapping area that is searched, the latter being explained further in relation to FIGS. 4c and 4d.

Figure 4B:
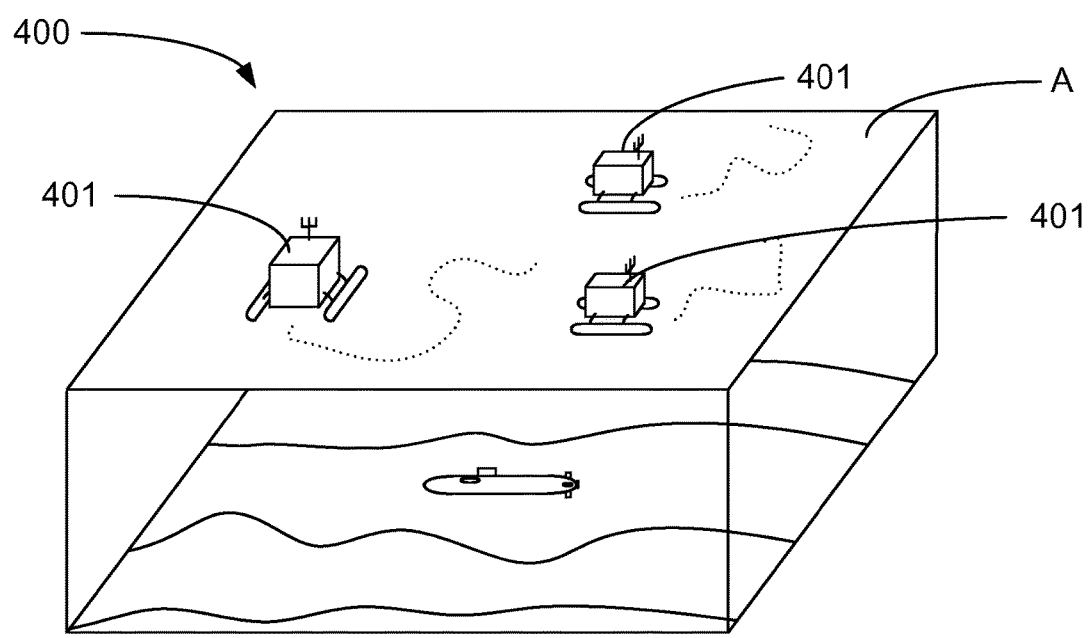

FIG. 4b illustrates another embodiment of a system 400 according to the present disclosure. The system 400 comprises a plurality of surface vessels 401, e.g., a surface vessel as described above in the context of FIG. 2, 3a or 3b. In the embodiment disclosed in FIG. 4b, each surface vessel 401 is arranged to operate in an autonomous state when gathering bathymetry measurements. Each surface vessel is also arranged to detect obstacles in the path and to autonomously adapt the path within the confined sea area A upon detection of an obstacle. According to an aspect, searching cooperatively comprises the plurality of surface vessels to navigate independently according to a stochastic model. In enhancement of the stochastic model, subareas of the confined sea area A can be emphasized during the search, e.g. subareas that are deemed more likely to hide a submarine are searched with higher accuracy than the rest of the confined sea area. For instance, a subarea of the confined sea area A having a high irregularity of its seabed is searched with higher accuracy than the rest of the confined sea area. According to an aspect, searching with higher accuracy comprises searching at least a subset of the subarea a plurality of times. According to an aspect, searching with higher accuracy comprises searching at least a subset of the subarea with different angles of the side-sonar. According to an aspect, searching with higher accuracy comprises determining the presence of an anomaly based on received reflected signals from at least two surface vessels, which will be described in more detail in FIGS. 4c and 4d below.

Figure 4C:
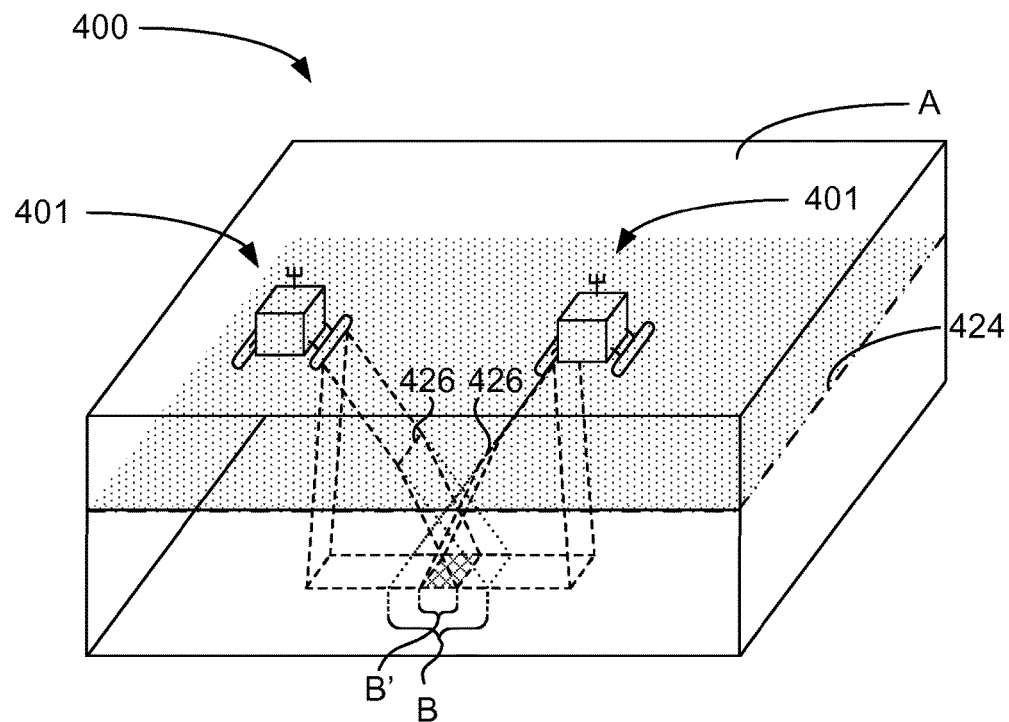
Figure 4D:
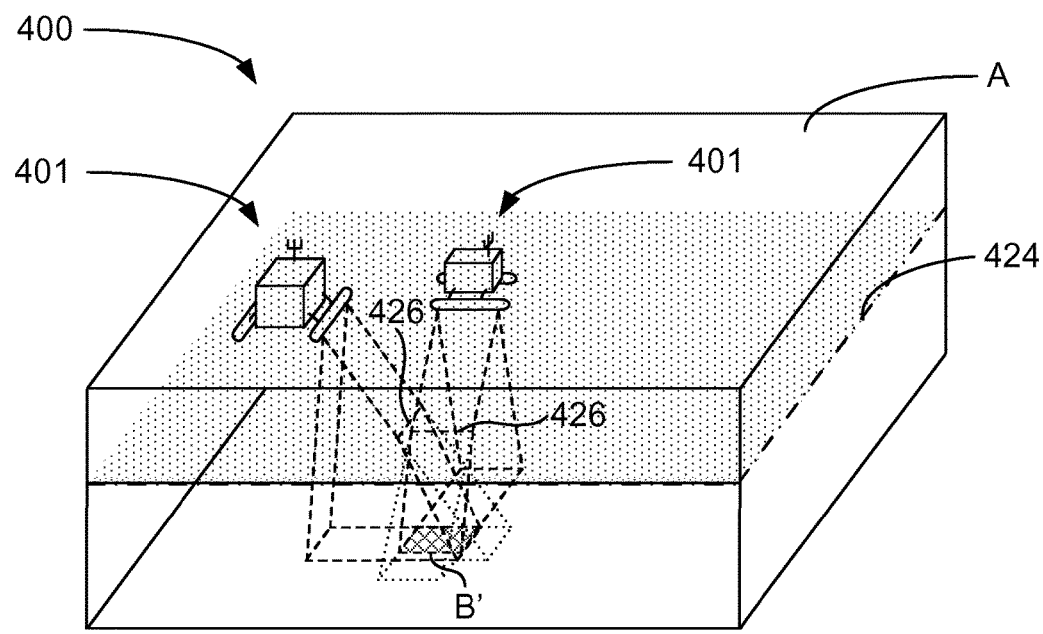

FIGS. 4c and 4d illustrate another embodiment of a system 400 according to the present disclosure. The system 400 comprises a plurality of surface vessels 401, e.g., a surface vessel as described above in the context of FIG. 2, 3a or 3b.

One of the main problems associated with anomaly detection in shallow waters is the potential for the shallow water to have a region where the water density changes rapidly, e.g. due to a rapid change in water temperature at the thermocline 424. The propagation of sound depends on the density of the medium in which it propagates. A sudden increase of the water density at the thermocline 424 causes the sonar signals to bend 426 at the interface between water layers of different densities. The area that is scanned by side-scan sonar gets distorted. For a single side-scan sonar, the exact effects can be difficult to predict without knowledge of the density profile of the shallow water. If there were no bending of the sonar signals, the two illustrated surface vessels would have a first overlapping area that is searched, indicated by the area B in FIG. 4c. Due to the bending of the sonar signals, the actual overlapping area that is searched will differ, as indicated by the second areas B' in FIGS. 4c and 4d. By exchanging data relating to the received at least one signal of the respective surface vessel 401, the effects of the changes in water density can be taken into account, which will improve the comparison between estimated depths based on bathymetry measurements and the predetermined bathymetry data. In addition to better determine which bathymetry data to use, the addition of the exchanged data also enables corrections of false sonar contacts and to reduce the high irregularity of the seabed.

Figure 4E:
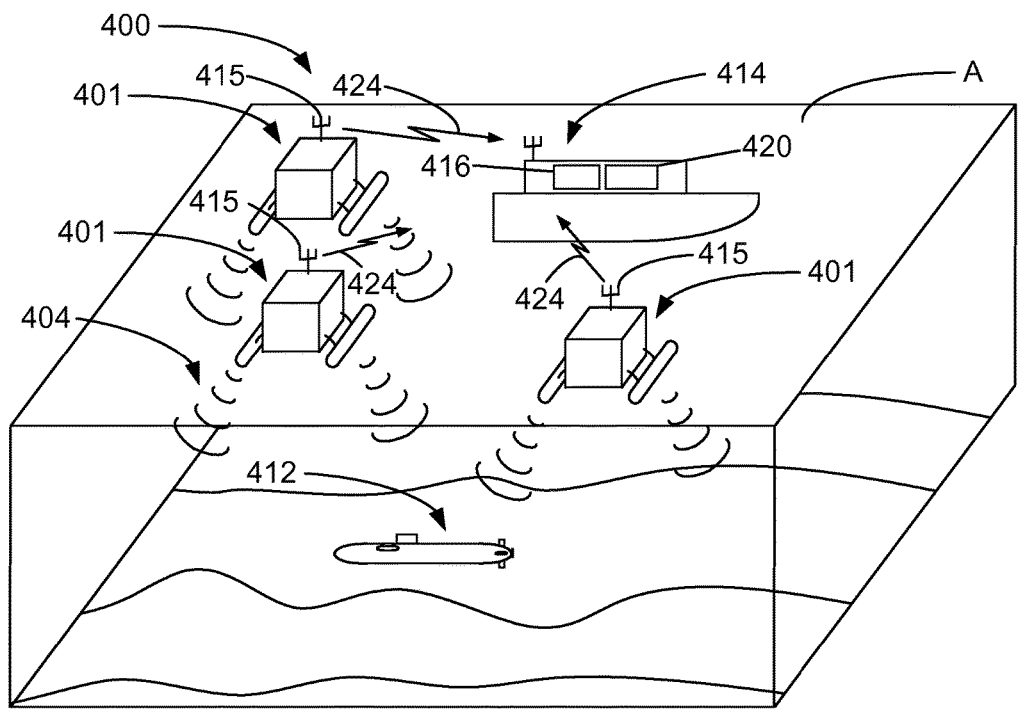

Further illustrating cooperation between surface vessels in the system for detecting subsurface objects in FIG. 4e, the presence of an anomaly is determined as follows. First, at least one surface vessel 401 transmits a sonar signal 404. The at least one surface vessel 401 receives at least one reflected signal based on the transmitted sonar signal 404. A bathymetry measurement derived from the received at least one reflected signal is compared to a stored bathymetric data of the same grid point(s). This can be done either in a control unit on the vessel or on a control unit at some other place. According to an aspect, the confined sea area A is searched cooperatively by the surface vessels 401. According to an aspect, the at least one surface vessel 701 changes a path of the respective at least one surface vessel 401 based on a stochastic model in response to a detected obstacle.

Figure 4F:
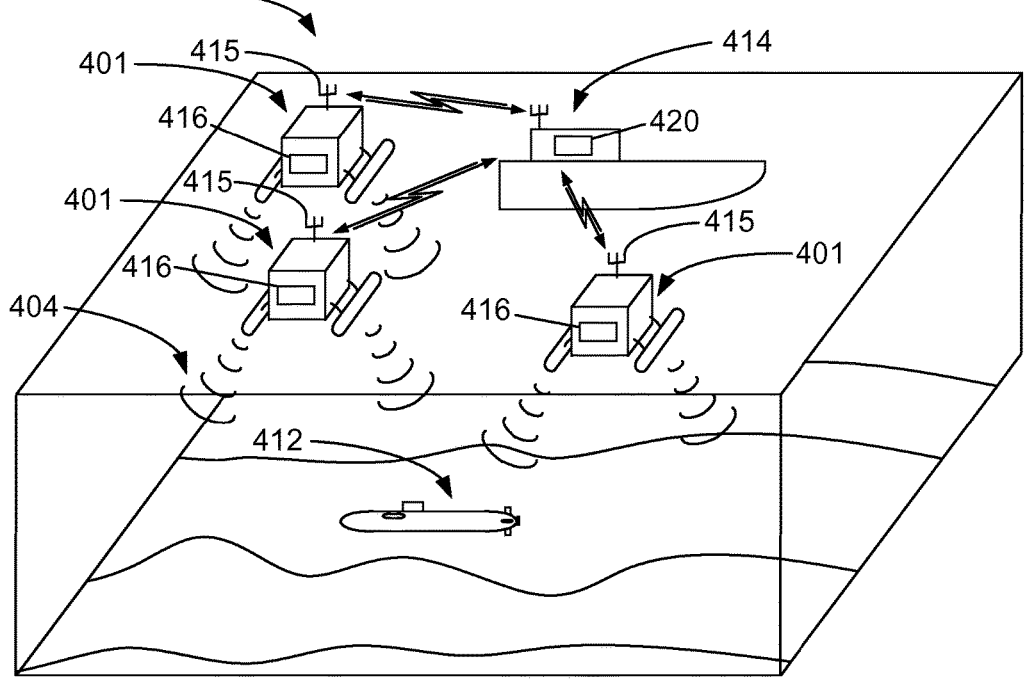

FIG. 4f illustrates another embodiment of a system 400 according to the present disclosure. The system 400 comprises a plurality of surface vessels 401, e.g., a surface vessel as described above in the context of FIG. 2, 3a or 3b.

The system 400 comprises a plurality of surface vessels 401 and a naval ship 414. Each surface vessel 401 is arranged to gather bathymetry measurements during controlled motion in a path within the confined sea area A and to compare the bathymetry measurements with pre-stored bathymetric data retrieved from a control unit.

The presence of an anomaly is determined as follows. First, at least one surface vessel 401 transmits a sonar signal 404. The at least one surface vessel 401 receives at least one reflected signal based on the transmitted sonar signal 404. According to one aspect the newly recorded bathymetric data is compared to bathymetric data recorded the previous time the vessel, or some vessel, was measuring the same grid point. Thus a bathymetric map may be gradually built up during the search.

According to an aspect, the request is limited to a subset of all available predetermined bathymetry data. According to an aspect, the surface vessel 401 only transmits a request for predetermined bathymetry data if the surface vessel 401 does not already have the necessary bathymetry data needed to determine the presence of an anomaly. The control unit of the surface vessel 401 receives the predetermined bathymetry data based on the request and determines the presence of an anomaly based on the predetermined bathymetry data and the at least one reflected signal.

The invention claimed is:

1. A system (200, 300, 400) for detecting subsurface objects within a confined sea area (A), the system comprising:
one or more surface vessels (201, 301, 401); and
at least one control unit (202, 302, 402),
wherein:
each surface vessel (201, 301, 401) comprises positioning means, collision detection means, and bathymetry measurement means and is arranged to gather bathymetry measurements during controlled motion in a path having an initial drive direction within the confined sea area (A) and to transmit the bathymetry measurements to the control unit (202, 302, 402),
each surface vessel (201, 301, 401) is unmanned and arranged to operate in an autonomous or remotely controlled state during the controlled motion in the path when gathering bathymetry measurements,
the at least one control unit (202, 302, 402) is arranged to receive, during the controlled motion in the path, bathymetry measurements from the one or more surface vessels (201, 301, 401),
the collision detection means are arranged for detecting obstacles in the path during the controlled motion in the path,
the at least one control unit (202, 302, 402) is arranged to retrieve bathymetry data representing said path from a memory in the control unit during the controlled motion in the path,
the at least one control unit (202) is arranged to compare, during the controlled motion in the path, the received bathymetry measurements to the retrieved bathymetry data, the comparison conducted being an analysis of a measured depth relative to a reference depth for at least one geographical position along said path and within the confined sea area (A),
the at least one control unit (202) is arranged to indicate, during the controlled motion in the path, a presence of a subsurface object based upon a determination, also during the controlled motion in the path, of a deviation between the received bathymetry measurements and the retrieved bathymetry data for the at least one geographical position along said path, the deviation representing a significant difference between the measured depth and the reference depth across one or more grid points within the confined sea area (A), and each surface vessel is arranged to autonomously adapt the path within the confined sea area (A) during the controlled motion in the path and upon detection of an obstacle, the adaptation of the path involving a rotational movement causing redirection of the surface vessel to a new drive direction angularly displaced from the initial drive direction of the path.

2. The system (200, 300, 400) according to claim 1, wherein the at least one control unit (202, 302, 402) is arranged to indicate presence of a subsurface object when the deviation between received bathymetry measurements and retrieved bathymetry data for the at least one geographical position along said path represents a reduced depth.

3. The system (200, 300, 400) according to claim 1, wherein the at least one control unit (202, 302, 402) is arranged to store the received bathymetry measurements in the memory as bathymetry data when detecting an initial absence of bathymetry data.

4. The system (200, 300, 400) of claim 1, wherein each surface vessel (201, 301, 401) comprises a control unit (202, 302, 402), each control unit (202, 302, 402) being arranged to receive bathymetry measurements from the surface vessel (201, 301, 401) in which it is comprised.

5. The system (200, 300, 400) of claim 1, wherein each surface vessel (201, 301, 401) comprises wireless communication equipment for device to device communication with other surface vessels.

6. The system (200, 300, 400) of claim 5, wherein:

the control unit (202, 302, 402) is a remote control station provided at a distance from at least one surface vessel, and wireless communication equipment is arranged to enable device to device communication between at least one surface vessel and the remote control station.

7. The system (200, 300, 400) according to claim 1, wherein:

each surface vessel (201, 301, 401) is arranged to receive or compute water level information relating to a water level of the confined sea area (A), and the at least one control unit (202, 302, 402) is further arranged to use the water level information to correct the received bathymetry measurement.

8. The system (200, 300, 400) of claim 1, wherein:

each bathymetry measurement comprise position data, and the bathymetry measurements are gathered periodically based on a travelled distance or a travel time along the path.

9. The system (200, 300, 400) according to claim 1, wherein the one or more surface vessels (201, 301, 401) are a fleet comprising a plurality of surface vessels cooperating in the monitoring of the confined sea area.

10. The system (200, 300, 400) according to claim 1, wherein one of the one or more surface vessels comprises the control unit.

* * * * *